United States Patent [19]
Lynch et al.

[11] 4,158,571
[45] Jun. 19, 1979

[54] NOVEL BINGHAM FLUIDS

[75] Inventors: Thomas J. Lynch, Houston; Robert J. Rowatt, Orange, both of Tex.

[73] Assignee: Gulf Oil Corporation, Pittsburgh, Pa.

[21] Appl. No.: 907,445

[22] Filed: May 19, 1978

Related U.S. Application Data

[63] Continuation-in-part of Ser. No. 838,776, Oct. 3, 1977, abandoned, which is a continuation-in-part of Ser. No. 835,271, Sep. 21, 1977, abandoned.

[51] Int. Cl.² ............... C08F 4/02; C08J 3/20; C08K 9/00
[52] U.S. Cl. .................. 106/271; 106/272; 252/426; 252/429 A; 252/430; 260/42.14; 526/1; 526/64; 526/86; 526/88; 526/106; 526/130; 526/159; 526/169; 526/169.2; 526/227; 526/352.2; 526/901; 526/903; 526/919
[58] Field of Search ............... 106/271, 272; 252/426 R, 429 A, 430; 260/42.14, 610 R; 526/1, 64, 86, 88, 106, 130, 159, 169, 169.2, 227, 352.2, 901, 903, 919

[56] References Cited
U.S. PATENT DOCUMENTS

| | | | |
|---|---|---|---|
| 3,061,601 | 10/1962 | Watt | 526/901 |
| 3,849,334 | 11/1974 | Frielingsdorf et al. | 526/903 |
| 3,884,857 | 5/1975 | Ballard et al. | 526/227 |

*Primary Examiner*—Alan Holler
*Attorney, Agent, or Firm*—Richard L. Kelly

[57] ABSTRACT

Bingham fluid compositions are provided which contain a functional material such as a polymerization initiator dispersed in a solid continuous phase, which is a mixture of a wax and a liquid hydrocarbon. Such compositions are prepared by heating the wax and the liquid hydrocarbon to form a melt and dispersing the functional material in the melt. Upon cooling, the composition solidifies with the functional material being uniformly dispersed throughout the continuous solid phase. The compositions, while solid at ambient temperature and pressure, assume the flow characteristics of a liquid under an applied pressure and can be pumped to feed the functional material to a polymerization reactor or molten polymer on a continuous basis.

25 Claims, 1 Drawing Figure

NOVEL BINGHAM FLUIDS

CROSS REFERENCE TO RELATED APPLICATIONS

This application is a continuation-in-part of our earlier-filed application Ser. No. 838,776 filed on Oct. 3, 1977, now abandoned, which in turn is a continuation-in-part of our earlier application Ser. No. 835,271 filed on Sept. 21, 1977, and now abandoned.

Our copending application Ser. No. 907,446, filed on May 19, 1978, is a continuation-in-part of our earlier application Ser. No. 835,270 filed on Sept. 21, 1977, now abandoned, and discloses certain low pressure processes in which olefins are polymerized in the presence of a liquid hydrocarbon and in which certain of the compositions of this application are employed to feed a solid polymerization catalyst to the polymerization zone.

The copending application of Ronald E. Gilbert and ourselves Ser. No. 907,517, filed on May 19, 1978, is a continuation-in-part of our earlier application Ser. No. 838,777 filed on Oct. 3, 1977, now abandoned, and discloses continuous mass, high pressure processes for the polymerization of ethylene in which certain of the compositions of this application are employed to feed free radical generating polymerization initiators to the polymerization zone.

The copending application of Ronald E. Gilbert and ourselves Ser. No. 907,444, filed on May 19, 1978, is a continuation-in-part of earlier application Ser. No. 835,268 filed on Sept. 21, 1977, now abandoned, and discloses certain vapor phase processes for the polymerization of olefins, particularly ethylene, in which certain of the compositions of this invention are employed to feed a solid polymerization catalyst to the polymerization zone.

The copending application of Ronald E. Gilbert and ourselves Ser. No. 907,531, filed on May 19, 1978, is a continuation-in-part of our earlier application. Ser. No. 835,269 filed on Sept. 21, 1977, now abandoned, and discloses certain processes for dispersing solid additives into molten ethylene polymers and in which certain of the compositions of this application are employed as the feed source of the solid additives.

Each of the above applications and the present application are assigned to a common assignee.

BACKGROUND OF THE INVENTION

In many types of chemical and polymer processes, it is necessary to feed small quantities of a functional material to a reaction zone or to a molten polymer stream. Frequently considerable difficulties are encountered in introducing such functional materials at a continuous, uniform rate. These problems are especially difficult when it is necessary to feed finely-divided solid materials to a liquid or vapor medium, or where it is necessary to feed a material to a highly viscous liquid system such as a stream of molten polymer.

An example of a system in which a solid material must be added to a liquid reaction system sealed from the atmosphere is the introduction of finely-divided solid catalysts into olefin polymerizations that are carried out in a liquid hydrocarbon medium. A common method for introducing such catalyst solids to the liquid polymerization medium is to suspend the catalyst solids in a hydrocarbon medium, feed such a suspension to a cup maintained in a rotatable valve, and then to rotate the valve to dump the catalyst solids into the reaction medium. A typical catalyst feeding system of this type is shown in U.S. Pat. No. 3,257,363. By feeding the catalyst solids to the reaction medium in this manner, the catalyst is added to the reaction medium in finite charges on a discontinuous basis. As a consequence, in most instances, the concentration of catalyst particles varies in different sections of the polymerization medium.

In view of problems of the above types, it would be desirable to have available to the art improved compositions and methods for feeding functional materials to reaction systems on a truly continuous and uniform basis.

SUMMARY OF THE INVENTION

The applicants have discovered certain Bingham fluids* containing dispersions of at least one functional material such as a polymerization catalyst uniformly dispersed throughout a continuous solid phase. These Bingham fluids flow readily under applied pressure and can be employed to introduce the functional material into a reaction system at a continuous uniform rate. The continuous solid phase of the Bingham fluid consists essentially of an intimate mixture of a wax and a liquid hydrocarbon.

*A Bingham fluid, sometimes referred to as a Bingham body, is a material which is a solid at a particular temperature under consideration, usually ambient temperature, but which will flow when subjected to an applied shearing stress which exceeds a minimum value characteristic of the system under consideration. For a description of the characteristics of Bingham fluids, see RHEOLOGY by Frederick Eirich, Academic Press Inc., New York City, Library of Congress Catalog Card 56-11131, particularly Volume 3, pages 198-201.

In one preferred embodiment of the invention, the functional material is a polymerization catalyst and the compositions are designed to introduce the catalyst into a mono-1-olefin polymerization reaction zone at a uniform rate. In a second preferred embodiment of the invention, the functional material is a polymer additive such as a colorant, an antiblock agent, an antioxidant, or the like, and the compositions are designed to introduce such additive(s) into a molten polymer at a uniform rate.

BRIEF DESCRIPTION OF THE DRAWING

The single drawing is a schematic representation of apparatus which can be employed to prepare the Bingham fluid compositions of the invention.

DETAILED DESCRIPTION OF THE INVENTION

Figure 1:
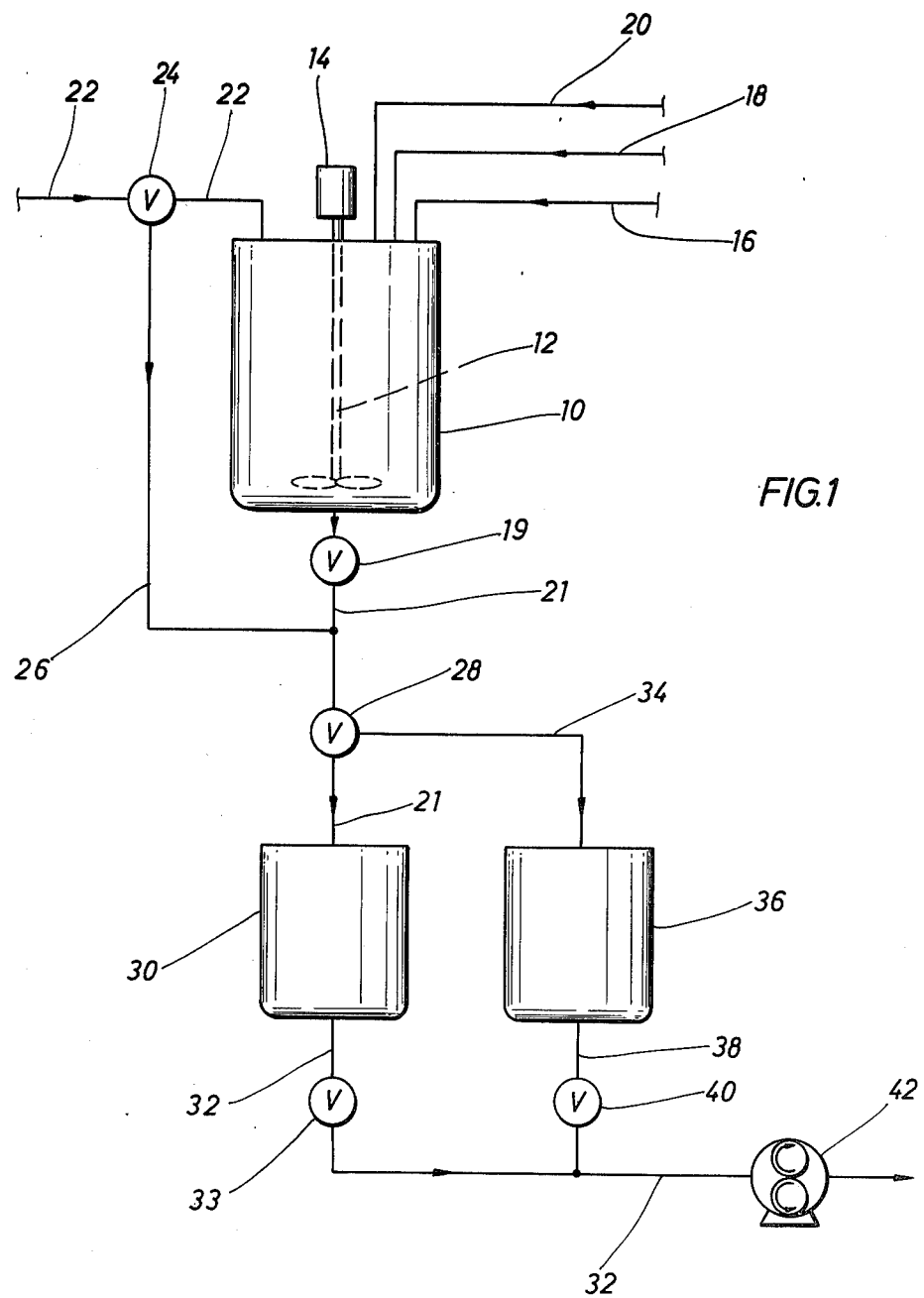

The continuous solid phase* of the Bingham fluid compositions of the invention consists of an intimate mixture of 100 parts by weight of a suitable wax and about 40–250 parts and preferably about 80–150 parts by weight of a liquid hydrocarbon. In special cases subsequently discussed, the wax and the liquid hydrocarbon can be employed in proportions outside of these ratios.

*The continuous solid phase customarily serves merely as a carrier for the functional material. In special cases subsequently described, one or both components of the continuous solid phase can play a functional role.

The continuous solid phase of the Bingham fluid compositions of the invention, in most instances, is not a true solid in a classical chemical and physical sense. Rather, it is a network of extremely finely-divided wax particles dispersed throughout the liquid hydrocarbon. In many instances the wax particles may be bonded to each other in a semi-crystalline lattice. In certain physical characteristics, the continuous solid phase resembles a gel. Regardless of its precise chemical and/or physical state, for the purpose of describing and claiming the invention, the wax-liquid hydrocarbon mixtures will be charcterized simply as a "continuous solid phase."

The wax component included in the Bingham fluid compositions of the present invention can be any of the known waxes, provided that it meets each of the following criteria:

1. At least 30 parts of the wax will be dissolved in 100 parts of n-heptane at 80° C.

2. A solution prepared per (1) above, when cooled to 20° C., forms a continuous solid phase having the characteristics described earlier herein.

3. The continuous solid phase prepared per (2) above will flow when subjected to a shear stress of 50 sec$^{-1}$. Suitable waxes are described in the *Kirk-Othner Encyclopedia of Chemical Technology*, Interscience Publishers, New York City, Second Edition, Library of Congress Card 63-1438, Vol. 22, pages 156-173, which description is incorporated herein by reference. Such waxes include the (a) animal waxes, e.g., bees wax, spermaceti wax, Chinese insect wax and shellac wax; (b) vegetable waxes, e.g., carnauba wax, candelilla wax, hydrogenated castor oil, ouricury wax, Japan wax, and bayberry wax; (c) mineral waxes, e.g., peat wax, montan wax, ozocerite wax, and petroleum waxes; and (d) synthetic waxes such as low molecular weight polyethylenes (which frequently are partially oxidized) and oxidized hydrocarbon waxes prepared from Fischer-Tropsch paraffins. The animal and vegetable waxes, while complex mixtures, are principally esters of a long chain fatty alcohol and a long chain fatty acid, although certain of the natural waxes also contain significant quantities of monoglycerides of long chain fatty acids such as glyceryl monostearate.

The preferred waxes for use in Bingham fluid compositions that are stored and used at ambient temperature, i.e., about 10° to 40° C., are the hydrocarbon waxes such as the petroleum waxes. Such hydrocarbon waxes are preferred by reason of their chemical inertness and their commercial availability in large volume at modest cost.

The petroleum waxes employed can be any one of the three principal categories of the petroleum waxes more specifically a paraffin wax, an intermediate wax, or a microcrystalline wax. As is recognized in the art paraffin waxes are predominantly normal paraffins, straight chain saturated hydrocarbons which may contain minor amounts of isoparaffins. The microcrystalline waxes are predominately cyclic saturated hydrocarbons (naphthenes) and isoparaffins. The intermediate waxes are blends or mixtures of paraffin and microcrystalline waxes. Table I below sets forth certain of the physical and chemical properties of these three classes of waxes.

TABLE I

|  | Paraffin | Intermediate | Microcrystalline |
|---|---|---|---|
| Melting Point Range, ASTM D126° F. | 120-160 | 120-160 | 120-160 |
| Molecular Weight Range | 340-400 | 360-550 | 500-600 |
| Density Range | 0.80-0.917 | 0.85-0.93 | 0.89-0.94 |
| Gravity ASTM D287 °API 210° F. | 35-60 | 30-55 | 30-50 |
| Distillation, Vacuum Corrected to 760 mm Hg 5% point, °F. | 750-810 | 825-900 | 950-1,050 |

A typical paraffin wax has the following properties:

| | |
|---|---|
| Gravity ASTM D287 °API | 41.3 |
| Melting point ASTM D87 °F. | 140.1 |
| Congealing point ASTM D938 °F. | 138.0 |
| Penetration ASTM D1321 at 77° F. | 14.0 |
| at 100° F. | 40.0 |
| Flash point, °F. | 455.0 |
| Ultraviolet absorbitivity at 280m ASTM D2008 | 0.01 |
| Iodine number | 0.4 |
| Molecular weight | 442.0 |
| Refractive index | 1.4359 |
| Distillation vacuum corrected to 760 mm. Hg 5% point, °F. | 804.0 |

It is known that certain of the petroleum waxes, depending upon their source, contain minor quantities of chemicals containing nitrogen, oxygen and/or sulfur atoms. Such minor components are difficult to remove. If such components are objectionable, as when a Ziegler-type polymerization catalyst is included in the Bingham fluid compositions, equivalent hydrocarbon waxes can be prepared by synthetic methods, as by hydrogenating synthetic higher mono-1-olefins, particularly the $C_{18}$ to $C_{30}$ monoolefins. Alternatively, such mono-1-olefins themselves can be employed as the wax.

The liquid hydrocarbon included in the compositions of the invention can be any of the common hydrocarbons of either the aliphatic or aromatic type. It is preferred to employ relatively low boiling aliphatic hydrocarbons, particularly the pentanes, hexanes, heptanes, and octanes.

The wax and the liquid hydrocarbon, when heated to a temperature sufficiently high to melt the wax and subsequently cooled to ambient temperature provide thick mobile, single phase wax-like solids.* These blends, while solid at ambient temperature and pressure, flow readily under modest pressures of less than about 100 psig.**

*Since the continuous phase consists of a mixture of two hydrocarbons, the transition between the solid state and the liquid state is not sharp. For the purpose of this invention, the continuous phase is considered to be a solid if it has the capability of holding finely-divided dispersed solids in suspension without significant settling for a period of 30 days at ambient temperature.

**A few isolated solids such as extremely fine silicas prepared by the burning of organosilicon compounds cause these Bingham fluids to gel. Such compositions flow only under higher pressures.

The precise physical characteristics of the wax-liquid hydrocarbon solid blends will depend somewhat upon the chemical type and the boiling point of the liquid hydrocarbon, and the chemical type and melting point of the wax employed. The ratio of the two components also has an effect upon the physical properties of the resultant blends. It has been observed, however, that by proper selection of the wax and the liquid hydrocarbon, and the proportions of the two components, it is possible to prepare compositions that are homogeneous at ambient temperature and will retain their single phase solid state over the normal range of ambient temperature encountered in the temperate zone, specifically from about 10° C. to about 40° C. Compositions of optimum properties are obtained when a hydrocarbon wax having a melting point in the range of about 60°-80° C. is blended with a $C_5$-$C_{10}$ aliphatic hydrocarbon, with about 80 to 150 parts of liquid hydrocarbon being employed per 100 parts of the hydrocarbon wax. In special cases, the functional material dispersed in the continuous solid phase can have an effect on the physical properties of the continuous solid phase. This phenomenon will be discussed subsequently.

The continuous solid phases of the Bingham fluids described above, by reason of being based on a hydrocarbon that is a liquid at ambient temperature, are solids at ambient temperature and atmospheric pressure. If the Bingham fluids are to be employed at subambient temperatures and/or stored at pressures above atmospheric, it is possible to employ in the continuous solid phase lower boiling hydrocarbons such as butane, butene-1, propane, propylene, or ethylene. These lower boiling hydrocarbons, for the limited purpose of the present invention, are considered to be liquid hydrocarbons.

It will be recognized, of course, that such systems must be maintained at temperatures and pressures below the critical point of the liquid hydrocarbon included in the Bingham fluid composition. The critical point for ethylene is 9.9° C. and 50.5 atmospheres. The use of ethylene as the liquid hydrocarbon is desirable where the Bingham fluid compositions are introduced into an ethylene polymerization reactor and it is desired to hold the introduction of extraneous compounds into the polymerization zone to an absolute minimum.

Where a Bingham fluid composition is employed containing a liquid hydrocarbon of the type described in the second paragraph above and is stored at a temperature below 10° C., it is feasible and usually desirable to employ as the wax an aliphatic hydrocarbon which is a liquid at the critical temperature of the liquid hydrocarbon, but which is a wax-like solid at the temperature at which the Bingham fluid is to be stored. $C_{15}$ or lower aliphatic hydrocarbon can be employed with $C_{10}$ to $C_{15}$ aliphatic hydrocarbons being preferred. Mixtures of ethylene and dodecane or tetradecane can be used with advantage as the continuous solid phase of such Bingham fluid compositions.

To prepare Bingham fluid compositions for addition to propylene polymerization systems, propylene desirably may be employed as the liquid hydrocarbon component. The critical point for propylene is 91.9° C. and 45.4 atmospheres. Thus such Bingham fluid compositions can be stored at ambient temperature, but must be stored under a propylene pressure sufficiently high to maintain the propylene in the liquid state at the prevailing temperature.

The type of functional material included in the Bingham fluid compositions of the invention will depend upon the ultimate purpose for which the compositions are to be used. As earlier noted, one important use of the compositions of the invention is to feed a relatively low concentration of a functional material to an olefin polymerization reaction system at a uniform rate. In such compositions, the functional material can be one which will initiate the polymerization of the monomer(s) in the reaction zone, or which will control one or more polymer properties, such as molecular weight, by functioning as a telogenating agent, or which will modify one or more polymer properties by functioning as a comonomer or the like.

As earlier noted, a second important use of the compositions of the invention is to feed functional additives into molten polymer streams at a uniform rate (and frequently at relatively low concentrations) to prepare polymer compositions having such additives uniformly dispersed throughout the polymer. Typical additives of this type included colorants, antiblock agents, slip agents, antistatic agents, cling agents, and other additives customarily used in polymers and reported in the literature.

The compositions of the invention are particularly useful in introducing solid functional materials into systems of the type previously described. Where solid materials are to be employed as the functional material, they should have a relatively small particle size, with the majority of the particles being a size such that at least 50% of the solids will pass through a 50 mesh screen (U.S. Standard).

One desirable class of functional materials which can be dispersed in the Bingham fluid compositions of the invention are finely-divided inorganic materials which catalyze the stereo-specific polymerization of olefins such as ethylene, propylene, higher monoolefins such as hexene, styrene, conjugated diolefins such as butadiene, isoprene, and the like. One example of such inorganic polymerization catalysts consists of a chromium catalyst supported upon a silica or a silica-alumina support. The chromium catalyst may be present as chromia, or certain organochromium compounds such as dicylopentadienyl chromium (II), and other similar organochromium compounds of the type disclosed in the following-issued U.S. Pat. Nos.: 3,157,712, 3,687,920, 3,756,998, 3,324,095, 3,709,853, 3,757,002, 3,324,101, 3,709,954, 3,806,500.

A second example of such inorganic polymerization catalysts consists of a molybdenum oxide catalyst carried upon an alumina support. A third example of such inorganic polymerization catalysts consists of the so-called Ziegler-type catalysts which are the reaction product of a salt of a transition metal of Group IV-B, V-B, or VI-B of the Periodic Table; and an organo-metallic compound of a metal of Group II-A, II-B, or III-A of the Periodic Table. The Periodic Table referred to is the same Periodic Table referred to in U.S. Pat. No. 3,219,648. The preferred examples of such catalysts are the reaction products of a titanium chloride and an aluminum alkyl. Desirably, such Ziegler-type catalysts may be deposited on an inert support to provide a large ratio of catalyst surface to catalyst weight. The Ziegler-type catalysts may be prepared in situ in the melted petroleum wax-liquid hydrocarbon blends as subsequently described. A detailed description of the above types of polymerization initiators are set forth in the text *Crystalline Olefin Polymers—Part I* by R. A. V. Raff and K. W. Doak, Interscience Publishers, 1965, Library of Congress Catalog No. 64-12191; which description is incorporated herein by reference.

A second desirable class of functional materials which can be dispersed in thee Bingham fluid compositions of the invention are free radical generating polymerization initiators. These initiators can be of any chemical type that decomposes to generate free radicals at an appropriate rate at the polymerization temperatures employed in the mass polymerization of ethylene. Typically, these initiators decompose at a rate such that one-half of the initiator decomposes in 10 hours at a temperature in the range of about 50°–130° C. Appropriate initiators of this type are widely reported in the literature. The maximum benefits of the invention are obtained when the polymerization initiators have limited solubility in liquid aliphatic hydrocarbons. Examples of suitable polymerization initiators included peroxides such as decanoyl peroxide, and azo initiators such as 2,2' - azo-bis-isoburyronitrile and azo-bis-isobutyramidine. Most free radical generating polymerization initiators, in their purified state, are solids. By reason of their potentially explosive nature, however, many of these compounds are supplied as solutions (principally in hydrocarbon solvents). These solutions can be incorporated directly into the Bingham fluid compositions without further purification.

A third desirable class of functional materials to be included in the Bingham fluid compositions of the invention are those which, when injected into a polymerization reaction system, function either to control a polymerization reaction, or to modify the properties of the polymer product being produced. An example of such a class of materials includes telogenating agents such as propane, nitrobenzene, nitrosobenzene, stilbene quinones, picrylhydrazyl, and the like. Another example of such a class of materials includes comonomers and other materials which will modify the polymer being produced, e.g., cyclopentene, acenaphthene, certain low molecular weight diene rubbers such as poly-1,2-butadiene, long chain alpha-olefins, etc. Yet another example of such a class of materials includes the organo silicones and flurosilicones such as dimethylsilicone, diphenylsilicone, and the like. These materials sometimes are injected into a particle form polymerization reaction zone to modify the size and/or shape of the polymer particles being produced.

A fourth desirable class of functional materials which are usefully dispersed in the Bingham fluid compositions of the invention are of the type incorporated into polymers, particularly ethylene and propylene polymers, to modify certain properties thereof. One example of such materials includes silica materials, particularly diatomaceous earth, which are incorporated into polymers to reduce the tendencies of polymer films prepared therefrom to adhere to each other, or "block." Such materials are frequently referred to as "antiblock" agents. A second example of such materials includes various materials such as carbon black, titanium dioxide, and other pigments and dyes which are employed to color polymers. A third example of such materials includes various materials such as hindered phenols, organophosphites, and the like which are incorporated into polymers to function as antioxidants, stabilizers, and the like. A fourth example of such materials includes so-called slip agents such as the long chain fatty acid amides, particularly oleamide and erucamide. A fifth example of such materials includes antistat agents such as glyceryl monooleate, glyceryl monostearate, and the like. Another example of such additives includes $C_{20}$ to $C_{40}$ hydrocarbons which sometimes are included in ethylene polymers as cling additives.

It will be recognized that certain functional agents may serve two or more functions when incorporated into certain polymer systems of interest. By way of examples, carbon black can be employed in ethylene polymers as a colorant. It also serves as a light stabilizer or sun-screen. Titanium dioxide serves a similar dual function when incorporated into propylene polymers.

In selected special cases, the functional material included in the Bingham fluid composition may serve as a partial or complete replacement for either the wax or liquid hydrocarbon included in the continuous solid phase of the Bingham fluid composition. Thus a binary mixture of a hydrocarbon wax and propane can be used to inject propane into a high pressure ethylene polymerization system to function as a telogenating agent. In this composition the propane serves the dual function as the liquid hydrocarbon component of the continuous solid phase and as a functional telogenating agent. Similarly, a binary mixture of a hydrocarbon wax and a liquid mono-1-olefin such as hexene can be used to inject hexene into an ethylene polymerization system. The hexene serves the dual function as the liquid hydrocarbon component of the continuous phase and as a functional comonomer. As earlier noted, higher mono-1-olefins such as $C_{20}$ to $C_{30}$ mono-1-olefins are waxes. For this reason, a binary mixture of a $C_{20}$ mono-1-olefin and hexane can be used to inject the $C_{20}$ mono-1-olefin into an ethylene polymerization system to function as a comonomer. Glyceryl monoesters of higher fatty acids such as oleic acid and stearic acid also are waxes. Thus a binary mixture of glyceryl monooleate (or glyceryl monostearate) and hexane can be employed to inject the glyceryl ester into a molten ethylene or propylene polymer to function as an antistat agent, or as a cling additive.

Certain inorganic solids when employed in admixture with liquid hydrocarbons function as Bingham fluids. When such solids are included in the compositions of the invention, they can function as a partial replacement for the wax. Examples of such materials include titanium dioxide, carbon black and some, but not all siliceous materials. The siliceous materials that can serve as a partial replacement for the wax contain hydroxyl groups and can be considered to be polymeric materials containing the grouping

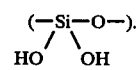

Typical examples of such siliceous materials include the products sold under the trade designation Cabosils*. Some natural occurring siliceous materials such as certain grades of diatomaceous earth function similarly. Siliceous materials consisting essentially of $SiO_2$ are inert and cannot serve as a partial replacement for the wax.

*Registered trademark of Cabot Corporation

The percentage of the functional material to be dispersed in the Bingham fluid compositions of the invention can be varied over a wide range and normally will be set to facilitate the incorporation of the appropriate quantity of the functional material into the polymerization zone or the molten polymer by pumping the Bingham fluid composition therein. Customarily, the functional material will be dispersed in the Bingham fluid compositions of the invention in the range of about 1–60 weight %, preferably about 1–40 weight %, and especially about 5–20 weight % of the total composition. It is apparent that the invention provides great flexibility in metering either high or low concentrations of a desired functional material into a system of interest, with the further advantage that the addition can be made at a uniform rate.

The compositions of the invention are particularly useful in introducing into mono-1-olefin polymerization systems of interest functional materials which are used at low concentrations and especially where the functional material has a low solubility in desirable solvents such as liquid hydrocarbons. This results from the fact that FDA requirements severely limit the types of solvents that can be added to mono-1-olefin polymers that subsequently will be used in contact with food stuffs. It also is noted that alternative solvents frequently contain functional groups which adversely affect the polymerization reaction or polymer properties.

A desirable characteristic of the Bingham fluid compositions of the invention is that they readily dissolve and/or disperse when they contact a liquid hydrocarbon. Thus, when a Bingham fluid composition containing a Ziegler-type catalyst is pumped into a reactor in which an olefin such as ethylene is being polymerized in a liquid hydrocarbon medium, the continuous solid phase is dissolved or dispersed in a very short period of time and the suspended solids are dispersed in the liquid medium to aid in the polymerization of the olefin.

The Bingham fluid compositions of the invention containing a Ziegler-type polymerization catalyst are an especially preferred embodiment of the invention, in that these catalysts are remarkably stable and not seriously deactivated by exposure to air and atmospheric moisture over extended periods of time. Such compositions can be shipped and stored in sealed containers for use at remote plant locations. This is a very real benefit in that Ziegler-type catalysts slurried in liquid hydrocarbons deteriorate rapidly upon exposure to the atmosphere. For this reason, nearly all Ziegler-type catalysts are manufactured at the site where they are to be used. By reason of the sensitivity of Ziegler catalysts to compounds containing oxygen, nitrogen and/or sulfur atoms, the wax included in such compositions should be a highly purified hydrocarbon wax of the type previously described.

Another desirable characteristic of the Bingham fluid compositions of the invention is that the wax and liquid hydrocarbon which make up the continuous solid phase are essentially inert and have no adverse effect on the polymer systems to which they are added. When the Bingham fluid compositions are added to an olefin polymerization being carried out in a hydrocarbon medium, the liquid hydrocarbon component of the Bingham fluid is removed from the polymer product with the hydrocarbon medium in which the polymerization is carried out. The wax will be removed from the polymer product, if the polymer product subsequently is treated with solvents to remove catalyst fragments, or atactic polymer present in propylene polymers. With other types of polymerization systems, the wax remains in the polymer product and is either innocuous or has a beneficial effect on certain polymer products. In a like manner, when the Bingham fluid compositions are employed to incorporate functional additives into a molten olefin polymer, the continuous solid phase has no adverse effect on the properties of the olefin polymer.

The physical state of the Bingham fluid compositions will be determined by the nature of the functional material included therein. When the functional material is a solid not soluble in the continuous solid phase, the final composition will consist of a uniform dispersion of the solid functional material in the inert continuous solid phase. When the functional material is a liquid not soluble in the continuous solid phase, the final composition will consist of a uniform dispersion of the liquid functional material in the continuous solid phase. When the functional material is soluble in the continuous solid phase, the final composition will be a homogeneous solid having the functional material dissolved therein.

The Bingham fluid compositions of the invention are preferably prepared by heating the desired proportions of wax and the liquid hydrocarbon in a stirred vessel and adding the functional material thereto. This mixture is agitated with sufficient intensity to disperse the functional material uniformly throughout the melt, after which the entire composition is cooled until it solidifies. The solidified mixture then is transferred to a suitable storage vessel. The compositions can be prepared in apparatus of the type illustrated in FIG. 1.

The apparatus illustrated in FIG. 1 contains a reactor 10 provided with a stirrer 12 driven by a motor 14. The reactor 10 is constructed so that it can operate under an applied pressure of at least about 100 psig. Lines 16, 18, and 20 are provided to feed to the reactor, respectively, a liquid hydrocarbon, a wax, and the functional material which is to be dispersed in the final Bingham fluid composition. A gas line 22 fitted with a two-way valve 24 is provided so that the reactor 10 can be pressurized to discharge the Bingham fluid composition from reactor 10 via outlet line 21, which contains a valve 19. Line 21 is connected to storage vessel 30. A two-way valve 28 is provided in line 21 so that the Bingham fluid composition from reactor 10 also can be fed through line 34 to a second storage vessel 36 which is maintained in parallel with storage vessel 30. A transfer line 32 equipped with a valve 33 is provided in storage tank 30 so that the Bingham fluid composition contained therein can be transferred therefrom by means of gear pump 42. In a like manner, an outlet line 38 equipped with a valve 40 is provided in storage tank 36 for feeding the Bingham fluid composition through line 32 to gear pump 42.

In the preparation of the Bingham fluid composition, a melted wax is introduced into reactor 10 through line 16. Liquid hydrocarbon is fed to reactor 10 through line 18. The wax and the liquid hydrocarbon are maintained at a temperature sufficiently high to keep the mixture liquid and are stirred to provide a homogeneous liquid phase. The desired functional material then is fed to reactor 10 via line 20. Stirring is continued to thoroughly disperse the functional material in the liquid phase. The contents of the reactor 10 then are cooled to the point at which the total composition is just above the gel point. The lines 16, 18, and 20 then are sealed by suitable valves not shown and the reactor is pressurized by an inert gas introduced into the reactor via line 22. Valves 19 and 28 are opened and the Bingham fluid composition in reactor 10 is transferred via line 21 to storage tank 30.

To assure that an adequate supply of Bingham fluid composition is available at all times, the operations above described are repeated with the exception that valve 28 is turned so that the Bingham fluid composition prepared in reactor 10 is transferred to the second storage tank 36.

With the storage tanks 30 and 36 filled with the desired Bingham fluid composition, the apparatus is in a condition to feed the Bingham composition to a polymerization vessel of the type described in the applicants' copending applications referred to earlier in this application. Valve 19 is closed and valves 24 and 28 are set so that gas from line 22 is fed through line 26 into line 21 so as to apply a pressure on the contents of storage tank 30. The pressure applied on storage tank 30 converts the Bingham fluid composition to the liquid phase and forces the composition through line 32 and valve 33 to gear pump 42 which feeds the composition to a reactor connected thereto. After storage tank 30 has been emptied, valve 28 is turned so that gas pressure introduced through line 22 is fed through line 34 to pressurize storage tank 36 which feeds its contents to gear pump 42. After storage tank 30 is empties and storage tank 36 is being emptied, additonal Bingham fluid composition is prepared in reactor 10 and is transferred to refill storage tank 30.

To prepare Bingham fluid compositions containing a normally gaseous hydrocarbon such as ethylene as the liquid hydrocarbon component of the Bingham fluid compositions, it is necessary to operate at reduced temperature and elevated pressures. The reactor 10 is charged with a hydrocarbon such as tetradecane (which will function as the wax) and the functional material such as a hydrocarbon solution of a free radical polymerization initiator. The mixture is well stirred and ethylene is admitted to reactor 10 at a pressure well in excess of 50.5 atmospheres. Reactor 10 then is cooled to a temperature well below 9.9° C. to liquify the ethylene. As the composition in reactor 10 is about to solidify, valves 19 and 28 are opened to transfer the Bingham fluid composition to storage vessel 30 which will be maintained well below 9.9° C. Valve 19 then is closed and valves 24 and 28 are adjusted so that storage vessel 30 is maintained under an ethylene pressure in excess of 50.5 atmospheres. When valve 33 is opened, the Bingham fluid composition will flow through line 32 to gear pump 42. Line 32, valve 33, and gear pump 42 will be maintained at a temperature below 9.9° C.

The following examples are set forth to illustrate more clearly the principle and practice of this invention to those skilled in the art. When parts and percentages are mentioned, they are parts and percentages by weight unless otherwise specifically noted.

EXAMPLE 1

Part A

A paraffin wax* having a melting point of 54°–56° C., in the amount of 716 gms, was melted and charged to reactor 10 which had a 3-liter capacity. The melted wax was cooled to a temperature of about 65° C. and 740 ml of a 20 weight % solution of triethyl aluminum in n-heptane was charged to the reactor. The contents of the reactor were cooled to about 55° C. and 109 gms of particulate aluminum-reduced titanium trichloride was charged to the reactor. Stirring was continued until the temperature was reduced to 40° C., at which point incipient solidification of the composition began to take place. Valves 19 and 28 were opened and a nitrogen pressure of 50 psig was introduced into reactor 10 by line 22 to transfer the contents of reactor 10 to storage tank 30.

*The wax was a synthetic paraffin prepared by hydrogenating a mixture of synthesized mono-1-olefins containing about 30 carbon atoms.

Part B

The Bingham fluid composition of Part A was employed as the catalyst to prepare polyethylene in a stirred particle form reactor. The polymerization reactor was run continuously with heptane being charged to the reactor at a rate of 320 lbs/hr. and ethylene being charged to the reactor at a rate of 30 lbs/hr. The polymerization was carried out at a temperature of about 90° C. and at a pressure of about 450° psig. The Bingham fluid composition of Part A was continuously introduced into the reactor via gear pump 42 at a rate of approximately 30 ml/hr. to feed the reactor the equivalent of about 1.4 gm. of the active catalyst per hour. Over a three-hour period, approximately 80 lbs. of polyethylene was produced, with polymer being produced at a rate of about 8950 lbs. of polyethylene/lb. of catalyst.

EXAMPLE 2

A charge of approximately 900 gms. of the same melted wax employed in Example 1, Part A, was made to reactor 10. A charge of approximately 500 ml of n-heptane then was fed to the reactor. There was then fed to the reactor 50 parts of decanoyl peroxide slurried in 200 parts of n-heptane. The mixture was stirred continuously and cooled to approximately 40° C., at which point incipient solidification of the composition began to take place. The Bingham fluid composition then was transferred to storage tank 30 as previously described in Example 1, Part A.

EXAMPLE 3

Another Bingham fluid composition can be prepared in the same manner as described in Example 2, except that the solid introduced into the reactor will be a bis (cyclopentadienyl) chromium (II) supported upon a silica support. This chromium catalyst can be prepared as described in U.S Pat. No. 3,709,853.

EXAMPLE 4

A Bingham fluid composition suitable for use in injecting a total additive package into a film grade low density ethylene polymer was prepared from 750 ml of hexane, 95 grams of the paraffin wax described in Example 1, 190 grams of diatomaceous earth, 450 grams of erucamide, and 380 grams of an antioxidant.

In this composition, the weight ratio of hexane to petroleum wax was about 5.2:1.0. A lower than normal quantity of paraffin wax was used as the composition contained a large quantity of diatomaceous earth which served as a partial functional replacement for the paraffin wax.

What is claimed is:

1. A polymerization-initiating, polymerization-controlling or polymerization-modifying Bingham fluid composition suitable for continuous direct addition to a continuous olefin polymerization reaction system, said composition being a solid at ambient temperature and capable of flow under an applied pressure, said composition consisting essentially of:
   (a) a continuous solid phase consisting essentially of an intimate mixture of a wax and a liquid hydrocarbon, and
   (b) at least one functional material capable of initiating, controlling, or modifying a polymerization reaction uniformly dispered throughout the continuous solid phase of (a).

2. A composition of claim 1 in which the continuous solid phase of (a) consists essentially of 100 parts by weight of a wax and about 40 to 250 parts by weight of the liquid hydrocarbon.

3. A composition of claim 1 or 2 in which the functional material of (b) dispersed throughout the continuous solid phase of (a) is a solid at ambient temperature.

4. A composition of claim 1 or 2 in which the functional material of (b) dispersed throughout the continuous solid phase of (a) is a catalyst for the polymerization of a polymerizable olefin.

5. A composition of claim 1 or 2 in which the functional material of (b) dispersed throughout the continuous solid phase of (a) is a chromium compound.

6. A composition of claim 1 or 2 in which the functional material of (b) dispersed throughout the continuous solid phase of (a) is the reaction product of a salt of a transition metal of Group IV-B, V-B, or VI-B of the Periodic Table and an organometallic compound of a metal of Group II-A, II-B, or III-A of the Periodic Table.

7. A composition of claim 1 or 2 in which the functional material of (b) dispersed throughout the continuous solid phase of (a) is the reaction product of a titanium chloride and an aluminum alkyl.

8. A polymer-modifying Bingham fluid composition suitable for continuous direct addition to a molten polymer stream, said composition being a solid at ambient temperature and capable of flow under an applied pressure, said composition consisting essentially of:
(a) a continuous solid phase consisting essentially of an intimate mixture of a wax and a liquid hydrocarbon, and
(b) at least one functional material capable of modifying a solid polymer uniformly dispersed throughout the continuous solid phase of (a).

9. A composition of claim 8 in which the continuous solid phase of (a) consists essentially of 100 parts by weight of a wax and about 40 to 250 parts by weight of the liquid hydrocarbon.

10. A composition of claim 8 or 9 in which the functional material of (b) dispersed throughout the continuous solid phase of (a) is a solid at ambient temperature.

11. A composition of claim 8 or 9 in which the solid functional material of (b) dispersed throughout the continuous solid phase of (a) is a finely-divided inorganic material.

12. A composition of claim 8 or 9 in which at least one of the functional materials is a colorant.

13. A composition of claim 8 or 9 in which at least one of the functional materials is carbon black.

14. A composition of claim 8 or 9 in which at least one of the functional materials is an antiblock agent.

15. A composition of claim 8 or 9 in which at least one of the functional materials consists predominately of siliceous material.

16. A composition of claim 8 or 9 in which at least one of the functional materials is diatomaceous earth.

17. A composition of claim 8 or 9 in which at least one of the functional materials is an antioxidant.

18. A composition of claim 8 or 9 in which at least one of the functional materials is a slip agent.

19. A composition of claim 1, 2, 8, or 9 in which the wax is a hydrocarbon wax.

20. A composition of claim 1 or 8 in which the mixture of (a) consists essentially of 100 parts by weight of a hydrocarbon wax and about 80–150 parts by weight of the liquid hydrocarbon.

21. A process for the preparation of a Bingham fluid composition having finely-divided particles of a first solid material uniformly distributed throughout a solid hydrocarbon mixture which consists essentially of:
(a) stirring a heated mixture of:
(i) a hydrocarbon wax,
(ii) a hydrocarbon which is a liquid at ambient temperature, and
(iii) finely-divided particles of a solid material which does not dissolve in a heated mixture of (i) and (ii) to suspend the solid particles of (iii) in a liquid phase, and
(b) cooling the mixture of step (a) to ambient temperature to recover a Bingham fluid containing the finely-divided solid material of (iii) uniformly dispersed throughout a continuous solid phase which consists essentially of an intimate mixture of the hydrocarbon wax and the hydrocarbon liquid;
the hydrocarbon wax and the liquid hydrocarbon employed in step (a) being present in proportion such that, upon cooling to ambient temperature, they will form a continuous solid phase which will flow at ambient temperature under an applied pressure.

22. A process of claim 21 in which the solid material distributed throughout the solid hydrocarbon mixture is a chromium polymerization catalyst.

23. A process for preparing a Ziegler-type catalyst composition having good storage characteristics and a reduced tendencey to be deactivated by exposure to atmospheric moisture and oxygen which consists essentially of:
(a) stirring a heated mixture of:
(i) a hydrocarbon wax,
(ii) a hydrocarbon which is a liquid at ambient temperature,
(iii) a salt of a transition metal of Group IV-B, V-B, or VI-B of the Periodic Table, and
(iv) an organometallic compound of a metal of Group II-A, II-B, or III-A of the Periodic Table, to form a finely-divided solid reaction product of (iii) and (iv) suspended in a liquid phase, and
(b) cooling the mixture of step (a) to ambient temperature to recover a Bingham fluid composition consisting essentially of a finely-divided reaction product of the transition metal compound and the organometallic compound uniformly dispered in a continuous solid phase which consists essentially of an intimate mixture of the hydrocarbon wax and liquid hydrocarbon;
the hydrocarbon wax and the liquid hydrocarbon employed in step (a) being present in proportions such that, upon cooling to ambient temperature, they will form a continuous solid phase which will flow at ambient temperature under an applied pressure; the transition metal salt and the organmetallic compound being employed in proportions to form an active olefin polymerization catalyst.

24. A process of claim 23 in which the transition metal salt is a titanium chloride and the organometallic compound is an aluminum alkyl.

25. An ethylene polymerization initiating Bingham fluid composition which is a solid at subambient temperatures but which will flow under an applied pressure consisting essentially of:
(a) a continuous solid phase consisting essentially of an intimate mixture of 100 parts by weight of a $C_{10}$ to $C_{15}$ aliphatic hydrocabon and about 40–250 parts by weight of ethylene, and
(b) an ethylene polymerization catalyst uniformly dispersed throughout the continuous phase.

* * * * *